US007747749B1

(12) United States Patent
Erikson et al.

(10) Patent No.: US 7,747,749 B1
(45) Date of Patent: Jun. 29, 2010

(54) SYSTEMS AND METHODS OF EFFICIENTLY PRELOADING DOCUMENTS TO CLIENT DEVICES

(75) Inventors: Bjorn Marius Aamodt Erikson, Mountain View, CA (US); Othman Laraki, Palo Alto, CA (US); Cosmos Nicolaou, Palo Alto, CA (US); Hanping Feng, Mountain View, CA (US); Jeffrey Glen Rennie, Mountain View, CA (US); Denis Lee Severson, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 793 days.

(21) Appl. No.: 11/418,649

(22) Filed: May 5, 2006

(51) Int. Cl.
*G06F 15/173* (2006.01)
*G06F 15/16* (2006.01)
*G06F 17/30* (2006.01)
*G06F 3/048* (2006.01)

(52) U.S. Cl. .................... 709/226; 709/219; 707/5; 715/858; 715/856

(58) Field of Classification Search ................ 709/226
See application file for complete search history.

(56) References Cited

U.S. PATENT DOCUMENTS

| 5,878,223 | A | | 3/1999 | Becker et al. ........... 395/200.53 |
| 5,978,791 | A | | 11/1999 | Farber et al. .................. 707/2 |
| 5,978,847 | A | | 11/1999 | Kisor et al. ................. 709/227 |
| 6,003,030 | A | | 12/1999 | Kenner et al. ................ 707/10 |
| 6,023,726 | A | * | 2/2000 | Saksena ....................... 709/219 |
| 6,029,175 | A | | 2/2000 | Chow et al. ................. 707/104 |
| 6,067,565 | A | * | 5/2000 | Horvitz ....................... 709/218 |
| 6,085,193 | A | * | 7/2000 | Malkin et al. ................. 707/10 |
| 6,085,226 | A | * | 7/2000 | Horvitz ....................... 709/203 |
| 6,098,064 | A | | 8/2000 | Pirolli et al. ................... 707/2 |
| 6,108,703 | A | | 8/2000 | Leighton et al. ............. 709/226 |
| 6,134,583 | A | | 10/2000 | Herriot ....................... 709/217 |
| 6,182,122 | B1 | * | 1/2001 | Berstis ........................ 709/217 |
| 6,182,133 | B1 | * | 1/2001 | Horvitz ....................... 709/223 |
| 6,195,622 | B1 | | 2/2001 | Altschuler et al. ............. 703/2 |

(Continued)

FOREIGN PATENT DOCUMENTS

EP 1182589 A2 2/2002

(Continued)

OTHER PUBLICATIONS

Bestavros, A., et al., "Server-initiated Document Dissemination for the WWW," *IEEE Data Engineering Bulletin*, 19(3):3-11, Sep. 1996, pp. 1-8.

(Continued)

*Primary Examiner*—Aaron Strange
*Assistant Examiner*—James Edwards
(74) *Attorney, Agent, or Firm*—Morgan, Lewis & Bockius LLP

(57) ABSTRACT

Documents are preloaded from a server to a client device before the client device submits a request for the preloaded documents. The server predicts which documents to preload based on past user browsing activities at the client device and document layouts. At the client device, specific graphical features may be applied to the links to the preloaded documents such that a user can easily tell which document link is associated with the preloaded documents.

12 Claims, 8 Drawing Sheets

U.S. PATENT DOCUMENTS

| | | |
|---|---|---|
| 6,405,252 B1 | 6/2002 | Gupta et al. ............... 709/224 |
| 6,421,726 B1 | 7/2002 | Kenner et al. ............... 709/225 |
| 6,484,143 B1 | 11/2002 | Swildens et al. ............... 705/1 |
| 6,493,702 B1 * | 12/2002 | Adar et al. ..................... 707/3 |
| 6,502,125 B1 | 12/2002 | Kenner et al. ............... 709/203 |
| 6,578,113 B2 | 6/2003 | Krishnamurthy et al. .... 711/141 |
| 6,581,090 B1 | 6/2003 | Lindbo et al. ............... 709/217 |
| 6,584,498 B2 * | 6/2003 | Nguyen ...................... 709/219 |
| 6,625,643 B1 | 9/2003 | Colby et al. ............... 709/217 |
| 6,631,451 B2 | 10/2003 | Glance et al. ............... 711/158 |
| 6,665,726 B1 | 12/2003 | Leighton et al. ............ 709/231 |
| 6,742,033 B1 | 5/2004 | Smith et al. ................. 709/224 |
| 6,766,422 B2 | 7/2004 | Beyda ........................ 711/137 |
| 6,883,135 B1 | 4/2005 | Obata et al. ................. 715/500 |
| 6,912,591 B2 | 6/2005 | Lash .......................... 709/246 |
| 7,100,123 B1 * | 8/2006 | Todd et al. .................. 715/862 |
| 7,130,890 B1 | 10/2006 | Kumar et al. ............... 709/218 |
| 7,461,155 B2 * | 12/2008 | Reisman ..................... 709/227 |
| 2002/0016786 A1 * | 2/2002 | Pitkow et al. .................. 707/3 |
| 2002/0156864 A1 | 10/2002 | Sniest ........................ 709/217 |
| 2002/0198961 A1 | 12/2002 | Krishnamurthy et al. .... 709/217 |
| 2003/0046343 A1 | 3/2003 | Krishnamurthy et al. .... 709/203 |
| 2003/0172075 A1 * | 9/2003 | Reisman ...................... 707/10 |
| 2004/0064577 A1 * | 4/2004 | Dahlin et al. ............... 709/235 |
| 2004/0205149 A1 | 10/2004 | Dillon et al. ................ 709/217 |
| 2004/0237044 A1 * | 11/2004 | Travieso et al. ............ 715/530 |
| 2004/0262051 A1 * | 12/2004 | Carro ....................... 178/18.05 |
| 2005/0033803 A1 | 2/2005 | Vleet et al. ................. 709/203 |
| 2006/0047804 A1 * | 3/2006 | Fredricksen et al. ........ 709/224 |
| 2006/0143568 A1 * | 6/2006 | Milener et al. ............. 715/738 |
| 2006/0167862 A1 * | 7/2006 | Reisman ........................ 707/3 |
| 2006/0294311 A1 | 12/2006 | Fu et al. ..................... 711/118 |
| 2007/0214052 A1 * | 9/2007 | Kao ............................ 705/15 |
| 2009/0049388 A1 * | 2/2009 | Taib et al. ................... 715/738 |
| 2009/0119286 A1 * | 5/2009 | Reisman ........................ 707/5 |

FOREIGN PATENT DOCUMENTS

| | | |
|---|---|---|
| GB | 2317723 A | 4/1998 |
| WO | WO 02/100117 A1 | 12/2002 |
| WO | WO 2005/006129 | 1/2005 |

OTHER PUBLICATIONS

Cao, P., et al., "A Study of integrated Prefetching and Caching Strategies," *Proceeding of 1995 ACM SIGMETRICS*, Jun. 1995, pp. 171-182.

Curewitz, K.M., et al., "Practical Prefetching via Data Compression," *Proceedings of the 1993 ACM Conf. on Management of Data (SIGMOD)*, Washington DC, May 1993, pp. 257-266.

Fan, L., et al., "Web Prefetching Between Low-Bandwidth Clients and Proxies: Potential and Performance," *Proceedings of the ACM SIGMET-RICS Conf.*, May 1999, pp. 178-187.

Griffioen, J., et al., "Reducing File System Latency Using a Predictive Approach," *Proceedings of 1994 USENIX Summer Conf.*, Jun. 1994, pp. 197-207.

Gwertzman, J.S., et al., "The Case for Geographical Push-Caching," *Proceedings on the 1995 Workshop on Hot Operating Systems*, 1995, 5 pages.

Kimbrel, T., et al., "Integrated Parallel Prefetching and Caching," *Proceedings of the 1996 ACM SIGMETRICS Int'l Conf. on Measurement and Modeling of Computer Systems*, 1996, pp. 262-263.

Kroeger, T.M., et al., Digital's Web Proxy Traces, ftp://ftp.digital.com/pub/DEC/traces/proxy/webtraces.html, Dec. 1996.

Markatos, E.P., et al, "A Top-10 Approach to Prefetching on the Web," *Technical Report No. 173, ICS-FORTH*, Heraklion, Crete, Greece, Aug. 1996, pp. 1-15.

Padmanabhan, V.N., et al., "Using Predictive Prefetching to Improve World Wide Web Latency," ACM SIGCOMM Computer Communication Review, Jul. 1996, 15 pages.

Palmer, M., et al., "Fido: A Cache That Learns to Fetch," *Proceedings of the 17th Int'l Conf. on Very Large Data Bases*, Barcelona, Spain, Sep. 1999, pp. 255-264.

Patterson, R.H., et al., "Informed Prefetching and Caching," *Proceedings of the 15th ACM Symposium on Operating Systems Principles*, Dec. 1995, pp. 79-95.

Schilit, B.N., et al., "TeleWeb: Loosely Connected Access to the World Wide Web," 5th Int'l World Wide Web Conference, Paris, France, May 6-10, 1996.

Tait, C.D., et al., "Detection and Exploitation of File Working Sets," *Proceedings of the 11th Int'l Conf. on Distributed Computing Systems*, May 1991, pp. 1-19.

Vitter, J.S., et al., "Optimal Prefetching via Data Compression," *Journal of the ACM*, vol. 43, Sep. 1996, pp. 771-793.

Williams, S., et al., "Removal Policies in Network Caches for World-Wide Web Documents," *Proceedings of ACM SIGCOMM '96 Conf.*, Aug. 1996, pp. 293-305.

Bruck, J., et al., "Weighted Bloom Filter," Information Theory, 2006 IEEE, Jul. 1, 2006 pp. 2304-2308.

Gong, X., et al., "Bloom filter-based XML Packets Filtering for Millions of Path Queries," Proceedings of the 21st International Conference on Data Engineering (ICDE 2005), 12 pages.

International Search Report and Written Opinion for International Application No. PCT/US2008/054167, mailed Jul. 2, 2008.

International Search Report and Written Opinion for International Application No. PCT/US2008/088047, mailed Feb. 23, 2009.

Office Action dated Feb. 3, 2009 for U.S. Appl. No. 11/675,601.

Office Action dated Feb. 25, 2009 for U.S. Appl. No. 11/418,648.

* cited by examiner

SYSTEMS AND METHODS OF EFFICIENTLY PRELOADING DOCUMENTS TO CLIENT DEVICES

RELATED APPLICATIONS

This application is related to U.S. patent application Ser. No. 10/882,792, "A System and Method of Accessing a Document Efficiently Through Multi-Tier Web Caching", filed on Jun. 30, 2004, which is hereby incorporated by reference in its entirety.

This application is also related to U.S. patent application Ser. No. 11/418,648, "Systems and Methods of Visually Representing Links Associated With Preloaded Content", filed on May 5, 2006, which is hereby incorporated by reference in its entirety.

FIELD OF THE INVENTION

The present invention relates generally to the field of a client-server computer network system, and in particular, to systems and methods of preloading a document efficiently through multi-tier web caching.

BACKGROUND OF THE INVENTION

In order to access a document (e.g., a webpage) on the Internet, a user must download the document from a web server to a client computer using a software application such as a web browser. Therefore, the document download speed is critical to the user's web browsing experience.

Multiple factors affect the document download speed. First, the bandwidth of the Internet network infrastructure is limited. Second, there are inherent inefficiencies with the hypertext transfer protocol (HTTP), the data transfer standard adopted by most web server providers and web browser developers. Third, many important recommendations published in the official HTTP protocol standard for improving document download speeds have not been implemented yet by manufacturers or developers or both.

Many proposals have been made to boost the document download speed at a little extra cost. Among them, a client cache residing in the client computer in connection with a web browser is a popular choice. Pre-selected documents such as static image files, frequently-visited webpages and the like, can be stored in the client cache so that the web browser does not have to download them repeatedly. From an on-line subscriber's perspective, client caching can reduce the average time required for rendering a document in the web browser. However, there are many limitations to this approach. For instance, the client cache cannot host a large number of pre-downloaded documents due to its limited size. Moreover, the client cache only contains documents that have been viewed by the subscriber previously, and therefore the client cache does not contain new documents that have not been requested by the subscriber.

It would therefore be desirable to provide systems and methods that address the problems identified above, and thereby improve the users' web browsing experience.

SUMMARY

According to a first aspect of the present invention, in response to a user request for a document from a client computer, a server computer selects one or more documents based on past user browsing activities on the requested document. The user browsing activities may be associated with all the users of the server computer, or a selected group of users, such as the users from a specific geographical region, or even an individual user. Next, at the server computer's initiative, the selected documents are transmitted to the client computer before the user at the client computer sends a request for any of the selected documents.

According to a second aspect of the present invention, in connection with a request for a document from a server computer, a client computer receives from the server computer at least two document links and a copy of prefetched document content associated with one of the document links. The client computer then displays the two document links in a web browser application. The document link associated with the prefetched document content is displayed in a style visually distinguishable from that of the other document link. As a result, a user can easily tell which of the two document links has associated prefetched document content, selection of which document link takes less time to access the document content, and/or which document link has associated document convent available in the local client cache, etc.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

Figure 1:
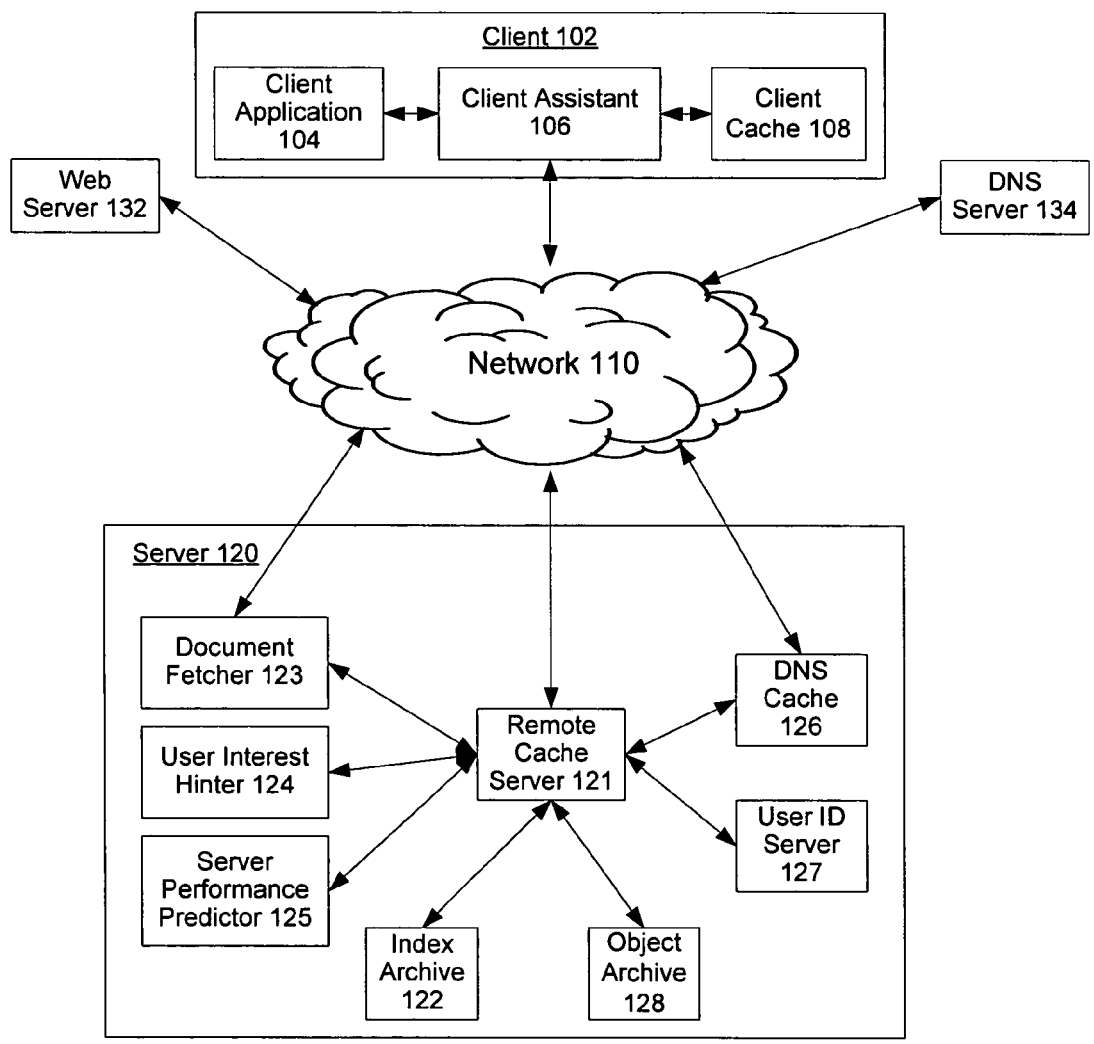
FIG. 1 is a block diagram illustrating the infrastructure of a client-server network environment according to some embodiments of the invention.

FIG. 1 is a block diagram illustrating the infrastructure of a client-server network environment 100 according to some embodiments of the invention. The environment 100 includes a plurality of clients 102 and a document server 120. The internal structure of a client 102 includes a client application 104 (e.g., a web browser), a client assistant 106 and a client cache 108. The client assistant 106 may establish communication channels with the client application 104, the client cache 108 and a remote cache server 121 residing in the document server 120, respectively. The client assistant 106 and the remote cache server 121 are procedures or modules that facilitate the process of quickly serving a document request initiated by a user of the client 102. The clients 102 (sometimes herein called client devices or client computes) may be any computer or other device that is capable of receiving documents from and send requests associated with document links to the document server 120. Examples include, without limitation, desktop computers, notebook computers, tablet computers, mobile devices such as mobile phones and personal digital assistants, and set-top boxes.

In this embodiment, the client application 104 has no associated cache or does not use its associated cache. Rather, the client application 104 directs all user requests to the client assistant 106. While the following discussion assumes, for illustrative purposes, that the application 104 is a web browser, the client application can, in fact, be any software application that uses a document identified by a network address such as a URL (universal resource locator). Similarly, the term "URL" means a network address or location in this document. In this context, the term "document" means virtually any document or content of any format including, but not limited to, text, image, audio, video, etc., that may be used by a web browser or other applications. An advantage of the arrangement shown in FIG. 1 is that all the web browsers or other applications in the client 102 can share the same client cache 108 and thereby avoid data duplication. But in another embodiment, the web browser 104 may use its own cache (not shown). Optionally, the client assistant 106 may synchronize the web browser's cache and the client cache 108.

The document server 120 includes at least a remote cache server 121, an index archive 122 and an object archive 128. In some embodiments, the remote cache server 121, the index archive 122 and/or the object archive 128 are deployed over multiple computers to enable fast access to a large number of cached documents. For instance, the index archive 122 and the object archive 128 may be distributed over N servers, with a mapping function such as the "modulo N" function being used to determine which cached documents are stored in each of the N servers. N may be an integer greater than 1, e.g., an integer between 2 and 1024. For convenience, the document server 120 is treated as though it were a single computer in this document. The document server 120, through its index archive 122 and object archive 128, manages a large number of documents that have been prefetched from various web servers 132 over the communications network 110. The term "web server" is used in this document to mean a web host or other source of documents stored at network locations associated with the web host.

In some embodiments, the document server 120 includes a document fetcher 123, a user interest hinter 124, a server performance predictor 125, a DNS cache 126, and a user ID server 127. These components may co-exist on a single computer or they may be distributed over multiple computers. As discussed below, each component is responsible for one or more predefined tasks associated with serving documents to a requesting client. The remote cache server 121 coordinates with these components to satisfy user requests from different clients 102.

In some embodiments, the remote cache server 121 provides a set of network addresses (e.g., URLs) and IP addresses of the associated web servers 132 to the document fetcher 123. The set of network addresses identifies documents to be downloaded from the web servers 132. The DNS cache 126 is used for resolving the IP address of a web server 132. The address records in the DNS cache 126 are updated by a third-party DNS server 134 to make sure that any address record in the DNS cache 126 is presumptively fresh and may be used by the document fetcher 123 for downloading documents. If no address record is found in the DNS cache 126, the remote cache server 121 may query the DNS server 134 directly for the IP address associated with a web server 132.

After receiving the set of network addresses and IP addresses, the document fetcher 123 then issues requests to the respective web servers 132 to prefetch the documents requested by the remote cache server 121. For each prefetched document, the remote cache server 121 conducts a few further processing procedures including, e.g., generating relevant entries in the index archive 122 and the object archive 128 for the prefetched document, and parsing the document to determine what document links and objects (e.g., images) are embedded in the document. To ensure the freshness of the document contents in the document server 120, the remote cache server 121 updates entries in the index archive 122 and the object archive 128 according to a predefined schedule. When the content of a cached document is found to have changed, the update operation uses the document fetcher 123 to prefetch documents from the web servers 132.

Whenever the remote cache server 121 receives a user request for a document, it identifies the requested document in the index archive 122 and the object archive 128. The requested document is then returned to the requesting client 102. To better serve the user, the remote cache server 121 attempts to predict what subsequent documents the user would like to see after viewing the currently requested document. To get such information, the remote cache server 121 sends an inquiry to the user interest hinter 124. The inquiry may include the URL fingerprint of the document-being-requested and the identity of the requesting user provided by the user ID server 127. The user interest hinter 124 then returns a list of document names or URL fingerprints to the remote cache server 121. The document names refer to the candidate documents the requesting user is most likely to visit right after the requested document. Different mechanisms may be employed by the user interest hinter 124 in generating the list of candidate document names. A more detailed description of these mechanisms is provided below in connection with FIGS. 3, 4 and 5.

For each member in the list of candidate document names, the remote cache server 121 identifies the corresponding candidate document in the object archive 128. In some embodiments, the remote cache server 121 does not transmit the candidate documents to the requesting client until after transmitting the requested document. In some other embodiments, the candidate documents and the requested document may be transmitted to the client computer simultaneously. For example, in some embodiments there are multiple communication channels of different priorities between the remote cache server 121 and the client assistant 106. The communication channels of higher priorities are used for transmitting the requested document and other communication channels of lower priorities are used for transmitting the candidate documents.

The server performance predictor 125 is used for predicting the performance of the document server 120. When a user requests a document from a client 102, the request can be met by either the document server 120 or a web server 132 that hosts the requested document. Depending on the configuration of the network 110 and the web server 132, there is no guarantee that the document server 120 will always serve the requested document faster than the web server 132. Sometimes, the document server 120 is more efficient than the web server 132. In other cases, serving the document from the web server 132 may be more efficient. To better serve the requesting user, the server performance predictor 125 may, periodically or not, compare the speeds of serving a document to a requesting client from a web server and the document server. The comparison result is provided to the client assistant 106 as a reference. If a particular web server outperforms the document server, the client assistant 106 will forward document requests to that web server whenever it receives a request for a document hosted by the web server. The comparison results are dynamically updated to reflect the dynamic nature of the network.

In some embodiments, there is a dedicated connection between the client assistant 106 and the remote cache server 121. This dedicated connection helps to reduce the communication latency between the client assistant 106 and the remote cache server 121. In one embodiment, the dedicated connection comprises at least one control stream and multiple data streams in each direction. These data streams serve as the communication channels between the remote cache server 121 and the client assistant 106. The remote cache server 121 uploads documents, including the requested document and the candidate documents, to the client assistant 106 using these data streams. The control stream may be used to allow the client assistant 106 and the remote cache server 121 to exchange control information or alter the priorities of the data streams. For example, the remote cache server 121 initially transmits a candidate document to the client assistant 106 using a low priority data stream. After receiving an actual request for the candidate document, the remote cache server 121 can elevate the priority of the data stream using the control stream in order to serve the user request more promptly.

Figure 2:
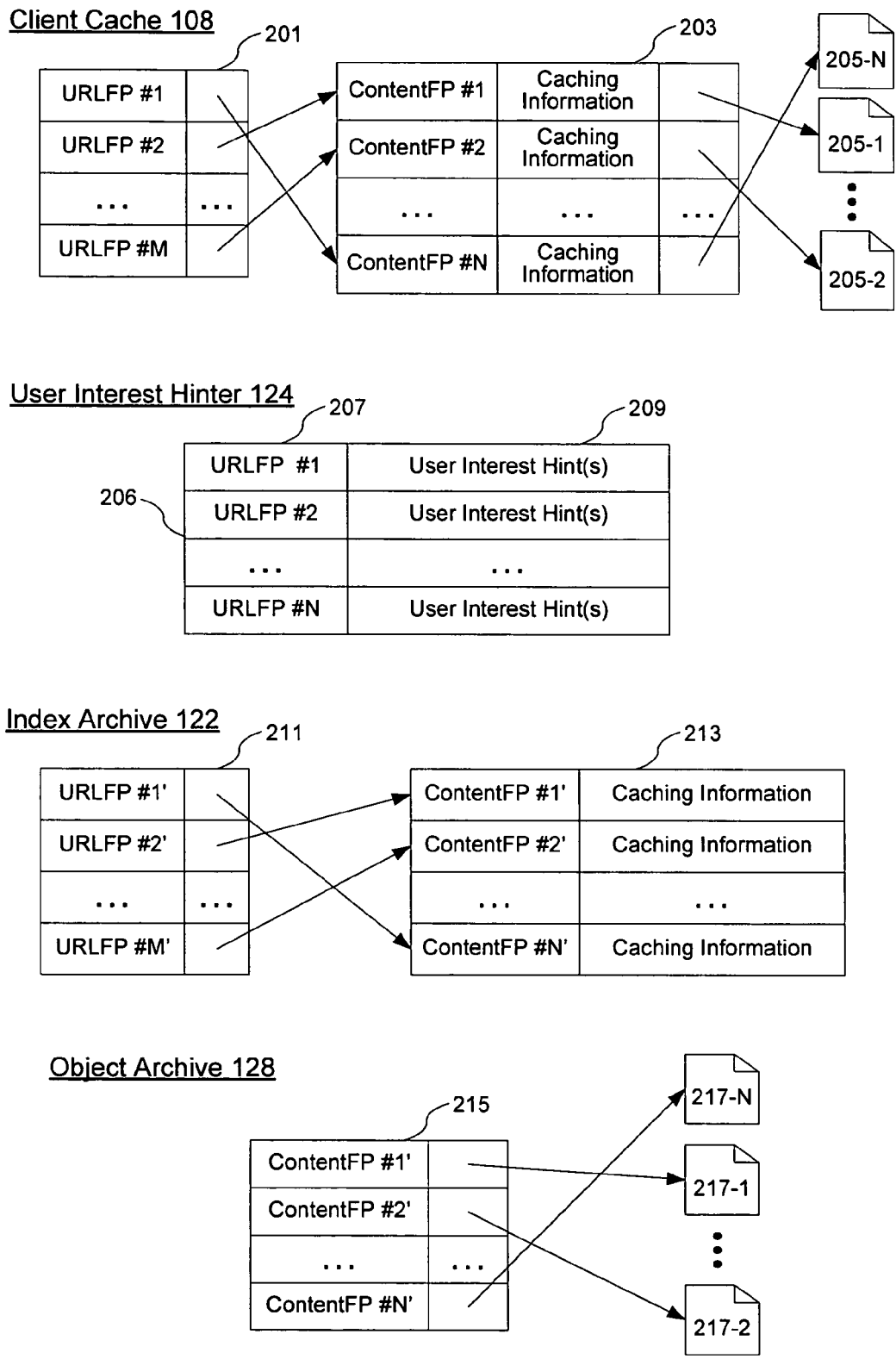
FIG. 2 depicts data structures associated with various components of the client-server network environment according to some embodiments of the invention.

FIG. 2 depicts data structures associated with various components of the client-server network environment 100 according to some embodiments of the invention. For instance, the client cache 108 includes a table 201 having a plurality of URL fingerprints. In some embodiments, a URL fingerprint is a 64-bit binary number (or a value of some other predetermined bit length) generated from the corresponding URL by first normalizing the URL text, e.g., by applying a predefined set of normalization rules to the URL text (e.g., converting web host names to lower case), and then applying a hash function to the normalized URL text to produce the 64-bit URL fingerprint. These URL fingerprints correspond to the documents stored in the client cache 108. Each entry in the URL fingerprint table 201 points to a unique entry in another table 203 that stores the content information of a plurality of documents. Each entry in the table 203 includes a unique content fingerprint (also known as content checksum), one or more content freshness parameters and a pointer to a copy of the corresponding document content 205. In one embodiment, some of the content freshness parameters are derived from the HTTP header of the document content 205. For example, the Date field in the HTTP header indicates when the document was downloaded to the client 102.

The user interest hinter 124 manages a table 206 for storing information about the candidate documents that a user is likely to visit after viewing a particular document. The table 206 includes two columns 207 and 209. The column 207 is a list of URL fingerprints. For each URL fingerprint in the column 207, there are one or more user interest hints in the corresponding entry of the column 209. These user interest hints are informed predictions or educated guesses of a user's navigation path. For example, a user may choose as his or her web browser's homepage the URL of wikipedia. Therefore, when the user opens the web browser, the first webpage he or she sees is the main page of the website wikipedia. After a quick look at the main topics listed in the webpage, some users may click the link to the featured article of that day while others may move to a different website. From analyzing the statistics of the navigation habits of a large number of users visiting the main page, the user interest hinter 124 associates the most frequently visited webpages (e.g., top-N) with the URL of wikipedia as the user interest hints.

Whenever the remote cache server 121 receives a user request for a document, it passes a URL fingerprint corresponding to the requested document to the user interest hinter 124. The user interest hinter 124 in turn checks the table 206 and, if the table 206 contains a corresponding entry, returns information about the top-N candidate documents associated with the requested document. The remote cache server 121 then preloads the top-N candidate documents and their associated objects (sometimes called dependent objects) to the requesting client computer. Examples of associated (or dependent) objects include images, CSS files, and JavaScript files.

In this multi-tier web caching environment, the document server 120 serves as a proxy of multiple web servers. It prefetches a large number of documents from the web servers 132 and saves them in the index archive 122 and the object archive 128. The index archive 122 maintains a mapping between a URL fingerprint in the URL fingerprint table 211 and a content fingerprint in the content fingerprint table 213. Each content fingerprint has associated caching information including, e.g., parameters indicating the freshness of the corresponding document content. In some embodiments, the set of freshness parameters includes an expiration date, a last modification date, and an entity tag, etc. The freshness parameters may also include one or more HTTP response header fields of a cached document. An entity tag is a unique string identifying one version of an entity, e.g., an HTML document, associated with a particular resource. The object archive 128 maps a content fingerprint in table 215 to a copy of the document content 217. In some embodiments, the tables 211, 213 and 215 are small enough to reside in the document server's main memory. In other embodiments, the document contents 217 are stored in one or more secondary storage devices 220, e.g., one or more hard disk drives.

As noted above, when the document server 120 receives a user request for a particular document, it may find not only the requested document but also the candidate documents. These candidate documents are selected based on the document server's prediction of the user's navigation path. Generally speaking, different criteria may be employed in choosing the candidate documents. In some embodiments, the prediction of a user's navigation path is based on the user's specific browsing activities. For example, if the user moves the mouse cursor over a particular document link for an extended period of time, the document server then infers that the user may be interested in the document associated with the document link. In some other embodiments, the prediction may be founded on the navigation habits of multiple users over a predetermined period of time. For example, if more than a threshold percentage of users choose to click the link to the featured article of that day after browsing the main page of the website of wikipedia, the document server will preload the featured article to the client computer when it receives a user request for the main page. In yet other embodiments, the layout of a webpage (or a website) also offers indications with respect to the popularities of the document links in the webpage. For instance, a document link having a larger font than other links in the parent document often links to a document that is likely to receive more hits. In contrast, a link located at the bottom of the webpage (e.g., a link to the copyright notice) is probably less likely to be selected by many users. In some websites, the location of a document link in a parent document indicates the popularity of the document corresponding to the document link. For example, document links located in the central region of a webpage are probably more popular than the ones at the bottom of the webpage. The analysis of the layout of a webpage (or website) may be combined with the user browsing activities in ranking the document links within each webpage. For example, if a document link having an associated large image receives more clicks, its popularity score may be boosted by a corresponding boost factor. Alternately, the popularity score may be generated as a weighted sum of a first score that is based on document properties of the document link and a second score that is based on user browsing activities (e.g., the number of user clicks on the document link in a predetermined period of time) with respect to the document referenced by the document link.

Below is a more specific description of the different mechanisms employed by a document server to predict a user's navigation path and then preload one or more candidate documents to the client computer. A common feature shared by these mechanisms is that the preloading process is driven by the document server, not the client computer. In other words, the document server takes the initiative to identify the subsequent document or documents that a user is likely to visit based on the user's mouse movement, or statistics of many users' web browsing histories, or the layout of the currently displayed document, or a combination of these. Therefore, this process is more appropriately characterized as the document server "preloading" candidate documents to a client computer proactively before receiving any specific request for the candidate documents.

Figure 3:
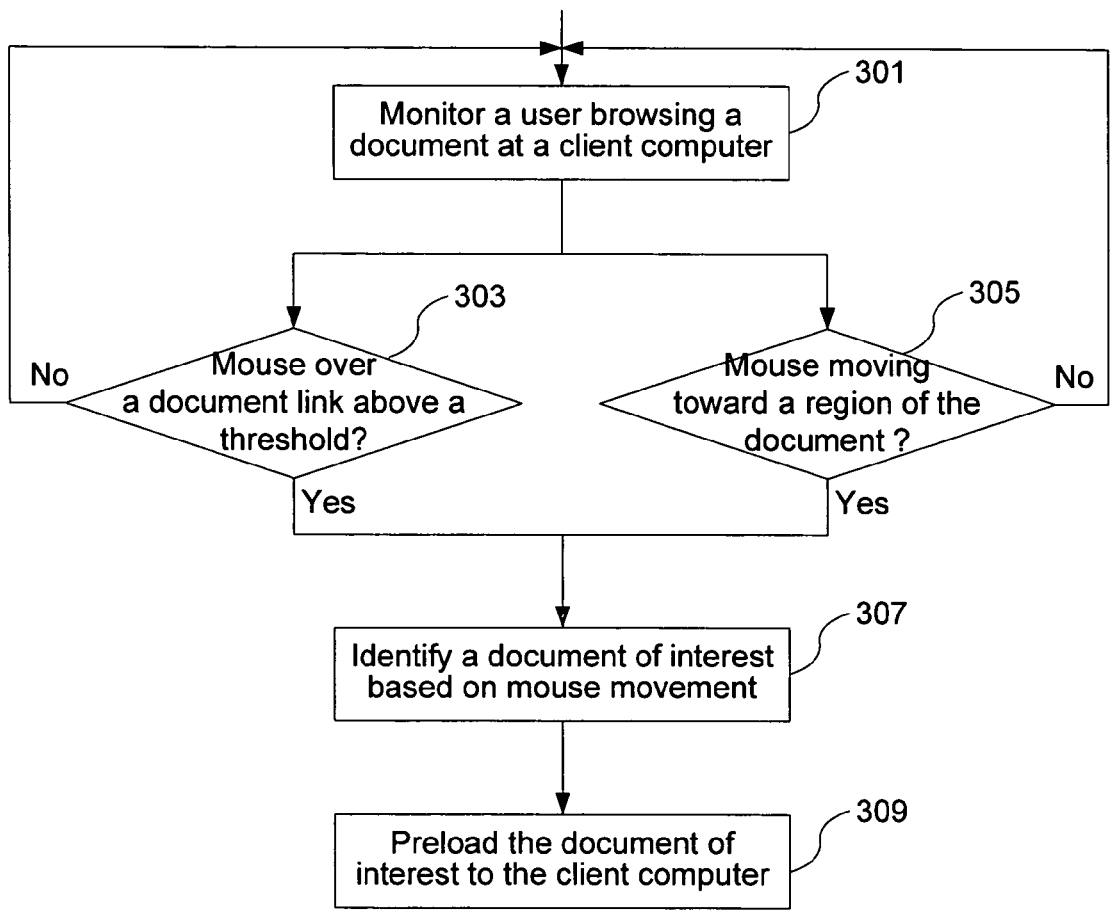
FIG. 3 is a flowchart illustrating a process of preloading one or more documents to a client computer based on a user's mouse cursor movement according to some embodiments of the invention.

In particular, FIG. 3 is a flowchart illustrating a process of preloading one or more documents to a client computer based on a user's mouse cursor movement according to some embodiments of the invention. Initially, a document is sent to a client computer in response to a user request. The client assistant 106 monitors the user's mouse movement while the user is browsing the requested document (301) because the movement of the mouse cursor may provide hints about the current focus of the user's attention. In some embodiments, the client assistant 106 transmits information about the mouse cursor location when the mouse cursor location coincides with a document link displayed by the browser, or more generally when mouse cursor location meets predefined criteria (e.g., when the browser cursor location is within a bounding box surrounding the document link) with respect to a document link displayed by the browser. Furthermore, in some embodiments, the client assistant 106 transmits information about the mouse cursor location whenever the mouse cursor location changes by at least a threshold amount, thereby enabling the document server to determine the trajectory of the mouse cursor and to predict which document link the user is likely to select in the near future.

If the user moves the mouse cursor above a document link and then keeps the mouse cursor there (e.g., within a proximity of the document link) for more than a threshold amount of time, it is likely that the user is going to request the document associated with the link by clicking the document link. Based on this information, the remote cache server 121 can act in advance by preloading the document associated with the link to the client computer. The threshold amount of time may vary from one embodiment to another. Exemplary values of the threshold amount of time are 0.2 seconds, 1 second, and values between 0.2 seconds and 1 second.

Alternatively, the mouse cursor's moving pattern may also convey information about the user's focus as well as interest. For example, if the remote cache server 121 determines that the mouse cursor is moving along a predetermined mouse trajectory (e.g., a relatively straight line), not randomly, toward a particular region of the requested document (herein called a predicted target region), it can selectively preload a document associated with a link in the predicted target region. The preloading of the document may begin even before the mouse cursor reaches the predicted target region.

More specifically, upon detecting a mouse location or a mouse movement meeting predefined criteria (e.g., the client assistant 106 may detect mouse movement that exceeds a predefined threshold velocity, or it may detect mouse movement exceeds the threshold velocity and follows a linear or nearly linear path, indicating purposeful mouse movement by the user), the remote cache server 121 checks if the index archive 122 and the object archive 128 contain the document (s) of interest or the candidate documents corresponding to the mouse movement (307). In some embodiments, if there is no matching document in the index archive 122 and the object archive 128, the remote cache server 121 simply aborts its document preloading attempt. In some other embodiments, if there is no matching document in the index archive 122 and the object archive 128, the remote cache server 121 asks the document fetcher 123 to prefetch the missing documents from the respective web servers 132.

Assuming that at least one candidate document of interest has been identified in the document server 120, the remote cache server 121 then preloads the document to the requesting client computer (309). In some embodiments, the remote cache server 121 first checks whether there is an update to the document if the client computer has a copy of the document. If there is no update to the document, there is no need to upload the document again. The client assistant 106 can use the existing copy in the client cache 108 to serve a specific user selection of the document link. Otherwise, the remote cache server 121 preloads the updated document to the client computer to make sure that no stale content is served to the requesting user.

Since candidate documents are preloaded based on predictions, the predictions will sometimes turn out to be wrong, in which case the user will not select the document link associated with a candidate document. There are two possible options for the client assistant 106 to deal with the server-initiated document preloading data stream between the client assistant 106 and the remote cache server 121. If there is sufficient space in the client cache 108 and sufficient free network bandwidth between the two parties, the client assistant 106 may allow the document preloading data stream to continue until completion. Alternatively, the client assistant 106 may issue a command to terminate the unfinished document preloading data stream.

Once a candidate document is preloaded to the client computer, it is first stored in the client cache 108 if there is no actual user request for that document. At the same time, the client assistant 106 may also update the currently rendered document to highlight the document link to the preloaded document from others. For example, the document link associated with the preloaded document may be displayed in the web browser in a unique combination of color and font or other formats (e.g., underlining) known to one skilled in the art. Since the candidate document links have a distinct look-and-feel from other document links, a user can easily tell which links in the currently displayed webpage correspond to preloaded documents from a glimpse of the webpage. Since it usually takes less time to render a preloaded document than a document which needs to be fetched from the server 120 or a web server 132, the user may be motivated to select a link to a preloaded document.

Figure 4:
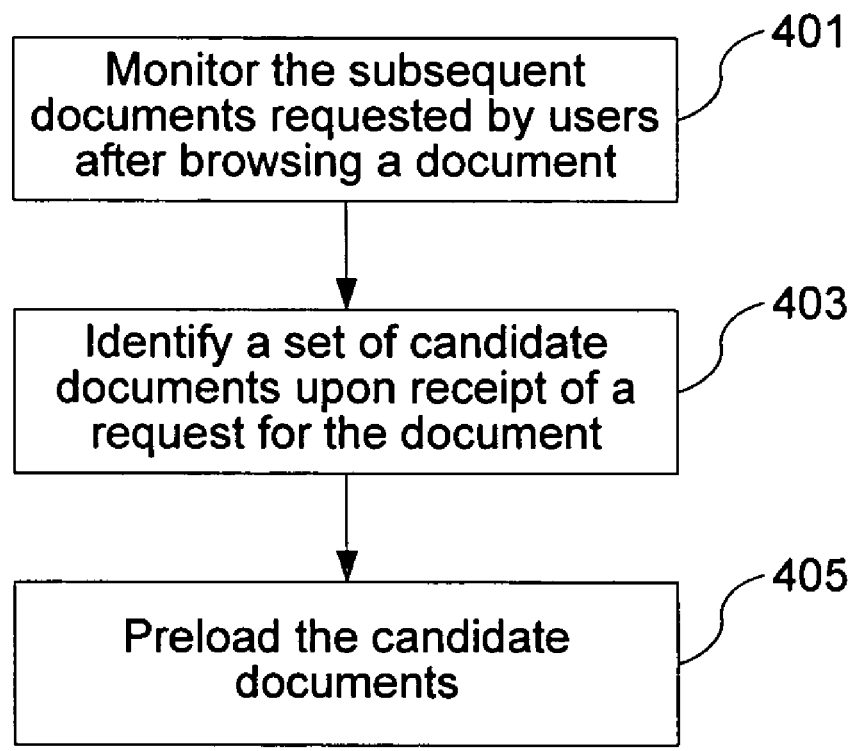
FIG. 4 is a flowchart illustrating a process of preloading one or more documents to a client computer based on users' web browsing statistics according to some embodiments of the invention.

The document preloading process described above is trigged by a specific user's browsing activity. This usually happens while the user is viewing one document through a web browser at the client computer. In contrast, FIG. 4 illustrates an even more proactive document preloading process. This is a process of preloading documents to a client computer based on the statistics of past web browsing histories by multiple users.

Referring to FIG. 4, when a document is rendered in the web browser, the remote cache server 121 monitors the subsequent documents requested by the user (401). The user selections at different client computers are summarized and forwarded to the user interest hinter 124. After accumulating a sufficient number of user selections of subsequent documents in connection with a specific document, the user interest hinter 124 can identify a subset from these documents as the candidate documents for the rendered document (403). In some embodiments, the user interest hinter 124 ranks the subsequent documents based upon their respective selection frequencies by different users for a given period of time. For example, the top five most frequently selected documents are chosen as the candidate documents associated with the rendered document. In other embodiments, the number of candidate documents may differ. For example, the number of candidate documents may be smaller for some parent documents than other parent documents. The number of candidate documents may be based, for example, on the collected user selection statistics, and may also be based on the number of links in the parent document. Also, the maximum number of candidate documents may be a number (e.g., two, three, four or six) other than five.

Subsequently, when there is a new request for the document, the remote cache server 121 contacts the user interest hinter 124 for the names or URL fingerprints of candidate documents associated with the requested document. The remote cache server 121 identifies the requested document and the candidate documents and uploads them to the requesting client computer (405). In some embodiments, the two types of documents are uploaded simultaneously, but through different data streams. The requested document is transmitted through a high-priority data stream and the candidate documents are preloaded through low-priority data streams since there is no request for any of them. In some other embodiments, the remote cache server uploads the requested document first and the candidate documents subsequently.

The user selection frequency of a preloaded candidate document is one exemplary basis for selecting candidate documents. The remote cache server 121 may use this piece of information to reinforce the popularity of the candidate document. In some embodiments, the user selection of a preloaded candidate document triggers the remote cache server 121 to start the next round of preloading candidate documents. In another example, candidate documents may be selected and prioritized in accordance with their respective page ranks. Alternately, candidate documents may be selected and prioritized in accordance with a combination of their user selection frequencies and their respective page ranks. A document having a higher page rank may be given a higher score, for purposes of selecting candidate documents, than another document having a similar user selection frequency but a lower page rank. In yet another alternative, the candidate documents are clustered into different categories. The user interest hinter 124 picks one or more representatives from each category and groups them together as the candidate documents of the document being rendered.

It is well-known that the Internet is comprised of many web servers linked together by networks. Each web server hosts a number of documents like webpages. Many on-line documents include one or more document links. In response to a user selection of a particular document link, the web browser downloads a corresponding document from a web server and renders the document to the requesting user. As noted above, a user's mouse movement can be used to predict which document link the user is likely to click. In anticipation of the forthcoming user selection, the remote cache server preloads one or more documents to the client computer to reduce the latency of serving user-requested documents. Besides the specific user activities on a document, the document's layout may also include hints with respect to which document links a user is most likely to click.

Figure 5:
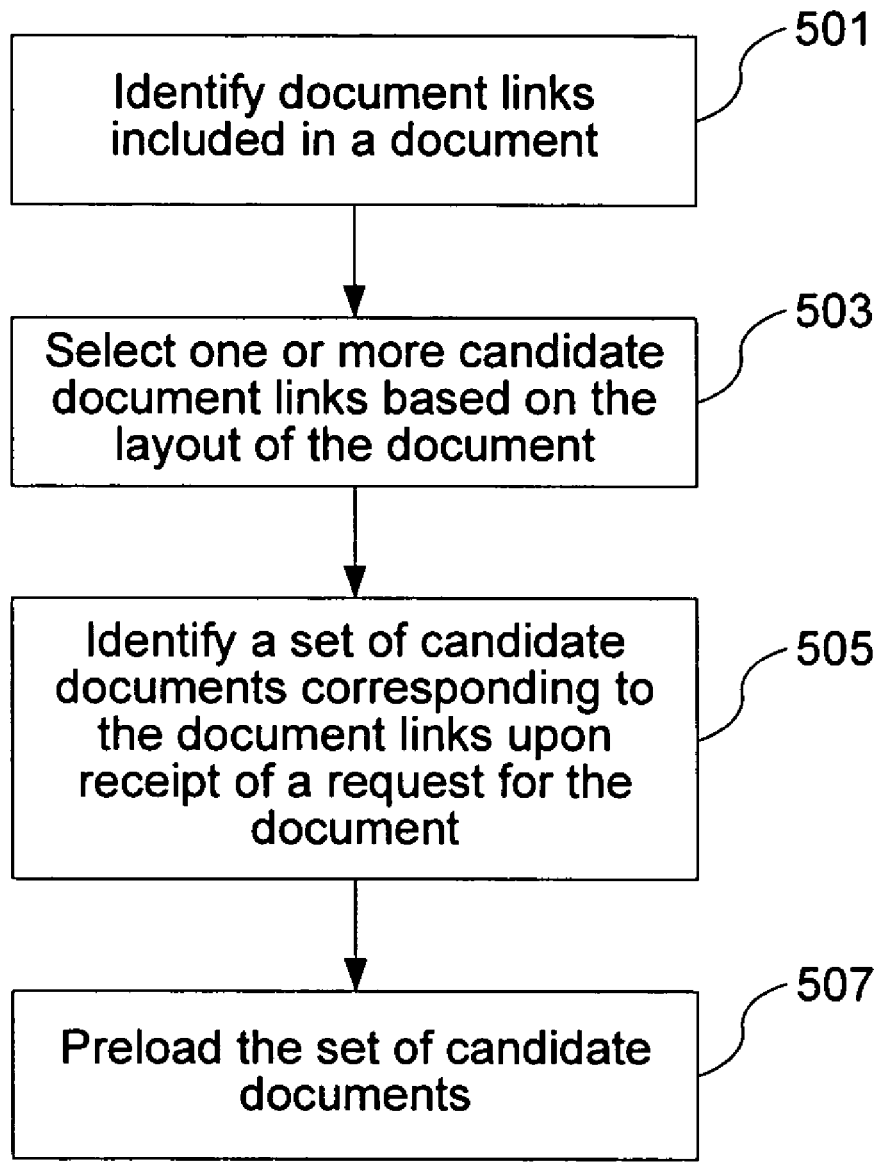
FIG. 5 is a flowchart illustrating a process of preloading one or more documents to a client computer based on a first document's layout according to some embodiments of the invention.

FIG. 5 depicts such a process of preloading documents to a client computer based on a documents' layout according to some embodiments of the invention. When the remote cache server 121 receives a document from the document fetcher 123, it passes the document to the user interest hinter 124. The user interest hinter 124 first identifies the document links included in the document (501). Next, the user interest hinter 124 selects from them one or more candidate document links based on the layout of the document (503).

There are many heuristic-based rules for selecting popular document links from a webpage based at least in part on its layout. For example, as a general principle of webpage layout design, the core subjects or topics of a webpage are usually allocated in the top and central regions of the webpage. This is because people pay more attention to these regions when looking at the webpage. Accordingly, a document link in these regions is likely to receive more attention. Within the webpage, key information items such as a person's name or a location are often highlighted using special fonts or colors. Some of these key information items have associated links to other documents. In some embodiments, or in some situations, these document links are given a boosted weight when choosing the candidate documents.

In some embodiments, for each identified document link, the user interest hinter 124 first generates a set of properties for the document link. These properties are, at least in part, based on the user-requested document's layout and content distribution. In some embodiments, these properties are user-specific. For example, the same document link may have different sets of properties for users from different geographical regions. For instance, the font size associated with the document link can be used to characterize the document link's importance. The larger the font size, the more important the document link. Different document links in different regions of the webpage are given different weights. Based on the properties of a document link, the user interest hinter 124 generates a popularity score for the document associated with the link. As noted above, in some embodiments, the popularity score of each linked document is based on the properties of the link in the parent document, while in other embodiments the popularity score of each linked document is determined in accordance with the properties of the link in the parent document and in accordance with the number of user clicks on the link by a community of users within a predetermined period of time. Finally, the user interest hinter 124 selects as candidate document links only those whose popularity scores are above a predetermined threshold level.

Sometimes, the popularities of document links within a webpage vary by time. For example, many people visit the website of CNN in the morning for the headline news.

Accordingly, the links to the full story of the headline news are more likely to be selected. But people are probably less interested in the headline news in the afternoon or at night since they may have learned the news while visiting the same website earlier in the day, or from other sources such as TV, newspaper, radio and competing websites. In this case, the user interest hinter 124 may generate several versions of candidate document links for each webpage and serve one of them to the remote cache server 121 based on the time at the location of the requesting client device.

When the remote cache server 121 receives a request for a particular document, the remote cache server 121 gets a set of candidate document links from the user interest hinter 124. After getting the candidate document links, the operation of the remote cache server 121 is similar to that discussed above in connection with FIG. 4. The remote cache server 121 identifies a set of candidate documents corresponding to the document links (505) and then preloads some or all of the candidate documents to the client computer (507). In some embodiments, the two document uploading processes occur at the same time, but through different data streams. The requested document is transmitted through a high-priority data stream and the candidate documents are preloaded through low-priority data streams. In some other embodiments, the remote cache server transmits the requested document first and the candidate documents subsequently.

After receiving the candidate documents associated with a document currently rendered in the web browser, the client assistant 106 has two choices. First, the client assistant 106 simply stores the candidate documents in the client cache 108. When it receives a subsequent request for any of them, the client assistant 106 can promptly satisfy the user request by serving the preloaded candidate document in the client cache 108. From the user's perspective, since it takes less time to view the requested document, the user's browsing experience is improved. But the user cannot tell from the web browser which candidate document has been or is being preloaded. In other words, the user does not know the existence of these candidate documents.

Alternatively, besides storing the preloaded candidate documents in the client cache 108, the client assistant 106 also updates the web browser to indicate their existence. This approach makes the user aware of which documents have been or are being preloaded into the local client cache. Since these candidate documents are results of an educated guess of the user's browsing interest, highlighting them in the web browser window may increase their probabilities of being selected by a user. Further, since these documents have been preloaded or are being preloaded, the user can get a quicker response from the web browser and therefore avoid waiting a long time for the web browser to download a user selected document that has not been preloaded.

Figure 6:
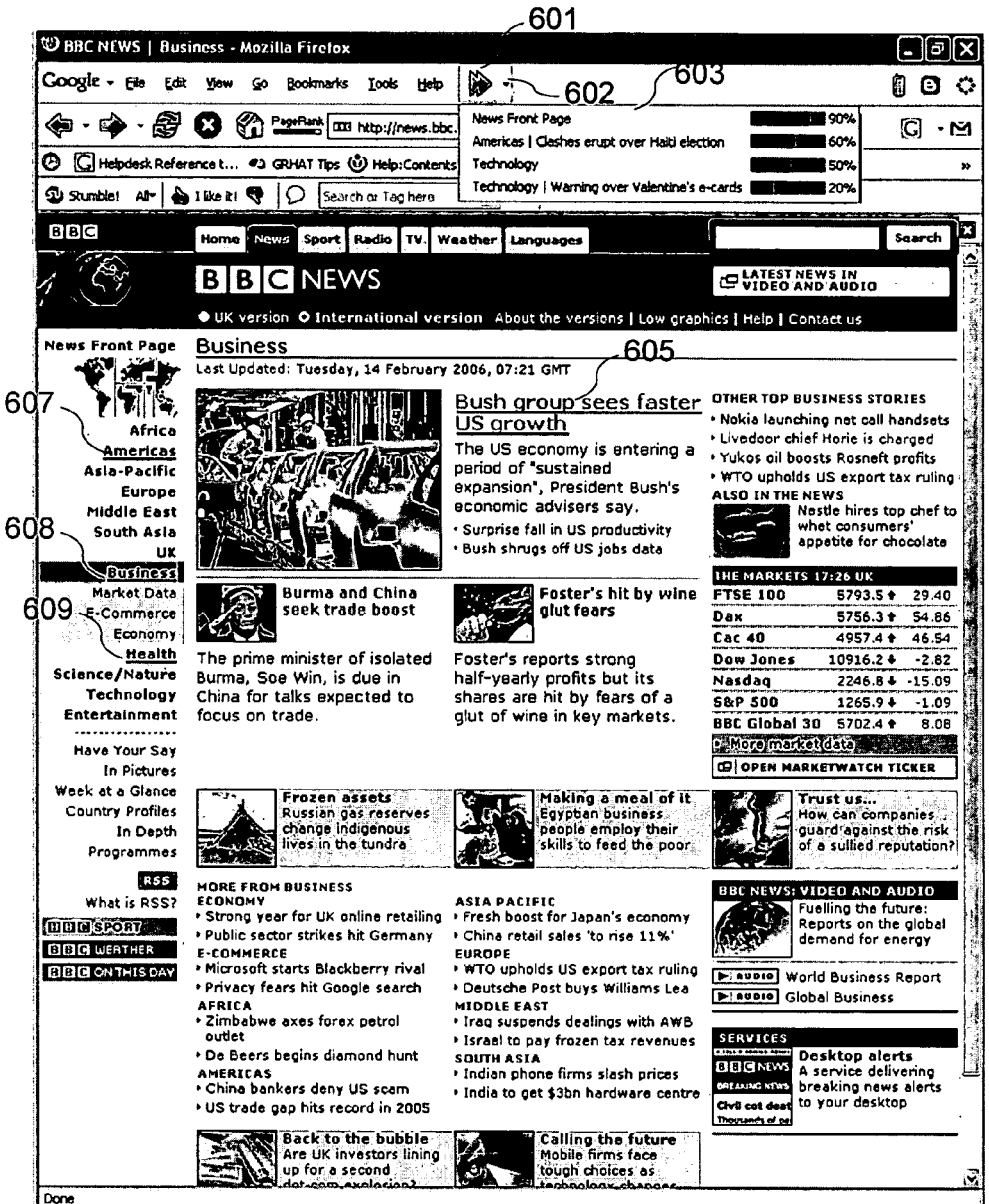
FIG. 6 is an exemplary screenshot of a web browser window displaying a webpage including one or more preloaded documents associated with the webpage according to some embodiments of the invention.

FIG. 6 is an exemplary screenshot of a web browser window displaying a webpage including graphical user interface (GUI) features highlighting the preloaded candidate documents associated with the webpage according to some embodiments of the invention. In this example, the webpage being displayed in the web browser is the international version of the BBC News on Business. At the top of the web browser window is a "Fast Forward" button 601. Next to the "Fast Forward" button 601 is a small dropdown menu button 602. User selection of the dropdown menu button 620 causes a dropdown menu 603 to be displayed. The dropdown menu 603 contains multiple entries, each entry corresponding to a preloaded candidate document.

In some embodiments, each entry in the dropdown menu 603 includes a title of a candidate document and a progressive bar indicating the amount of document content that has been received by the client computer. FIG. 6 depicts that the progressive bar contains two color bars, the first color bar corresponding to the percentage of the document content that has been received by the client computer and the second color bar to the percentage of the document content that has not yet been received.

In some embodiments, the "Fast Forward" button 601 is linked to the top entry of the dropdown menu 603. When a user clicks the button 601, the web browser automatically replaces the current webpage with the preloaded candidate document associated with top entry in the dropdown menu. In some other embodiments, the "Fast Forward" button 601 is directed to the entry whose associated candidate document is the first one that has been completely preloaded. If no document has been completely preloaded, a click of the button 601 brings up the dropdown menu 603. The user can select one entry in the dropdown menu that matches his or her current interest. Clearly, there are many other ways of linking the button 601 and the entries in the dropdown menu 603 known to one skilled in the art.

Some entries in the dropdown menu 603 may be associated with the document links in the BBC News on Business webpage. Other entries may not be associated with any document link in the webpage. For example, the user interest hinter 124 may find that many visitors to the BBC News on business webpage leave the webpage for another one at a different website. If the number of visits received by the different webpage is above a predetermined threshold, the remote cache server 121 will preload that webpage to the client assistant 106 although there is no direct link between the two webpages. Accordingly, an entry corresponding to the webpage is going to appear in the dropdown menu. In some embodiments, the dropdown menu 603 only includes entries corresponding to the candidate documents that are not directly associated with the current webpage.

Once a user requests a new webpage from a web browser, the user interest hinter 124 may find another set of candidate documents for the new webpage. This set of candidate documents replaces the set of candidate documents associated with the BBC News on Business webpage. But there may be overlaps between the two sets of candidate documents. A candidate document may be present in both sets. If so, the remote cache server 121 can reuse the candidate document that has been or is being preloaded to the client computer.

As noted above, the relationship between the webpage currently displayed in the web browser window and the candidate documents associated with the "Fast Forward" button and the dropdown menu is based on the user interest prediction by the document server. In some embodiments, there may be no inherent logical or grammatical connection between the webpage and any of the candidate documents. In some embodiments, even if there is such a connection, it has little, if any, weight when the document server determines candidate documents for the webpage.

At the center of the webpage is a news report on the growth of the US economy. The webpage provides a summary of the news report. A user has to click the link 605 to read the full article. The location of the link 605 and its font size as well as many other factors suggest that this news report is more likely to be requested than other documents having links on this webpage. In this case, the remote cache server 121 acts proactively by preloading the news report to the client computer. An underline is added to the title of the article to suggest that it has been or is being preloaded. A user should expect a faster response when clicking the link 605. In some embodiments, the underline used for indicating a preloaded document has a distinct style different from other typical, default styles used for underlining a document link in a webpage to attract more user attention.

As shown in FIG. 6, three other links 607, 608, and 609 have similar underlines to suggest that their associated documents are also preloaded. In some embodiments, the web browser underlines the document links in the webpage that are also listed in the dropdown menu. In some other embodiments, the web browser only underlines the document links missing from the dropdown menu. For example, the third entry in the dropdown menu 609 corresponds to the Technology link in the same webpage. But the link in the webpage is not underlined. This different treatment in terms of GUI features may be useful to indicate that different sets of preloaded documents are generated using different mechanisms. For example, the document links in the webpage are underlined if they meet certain layout criteria or if they are related to some specific mouse movements. The document links in the dropdown menu are selected based on the statistics of many users browsing the webpage over a predefined period of time.

Figure 7:
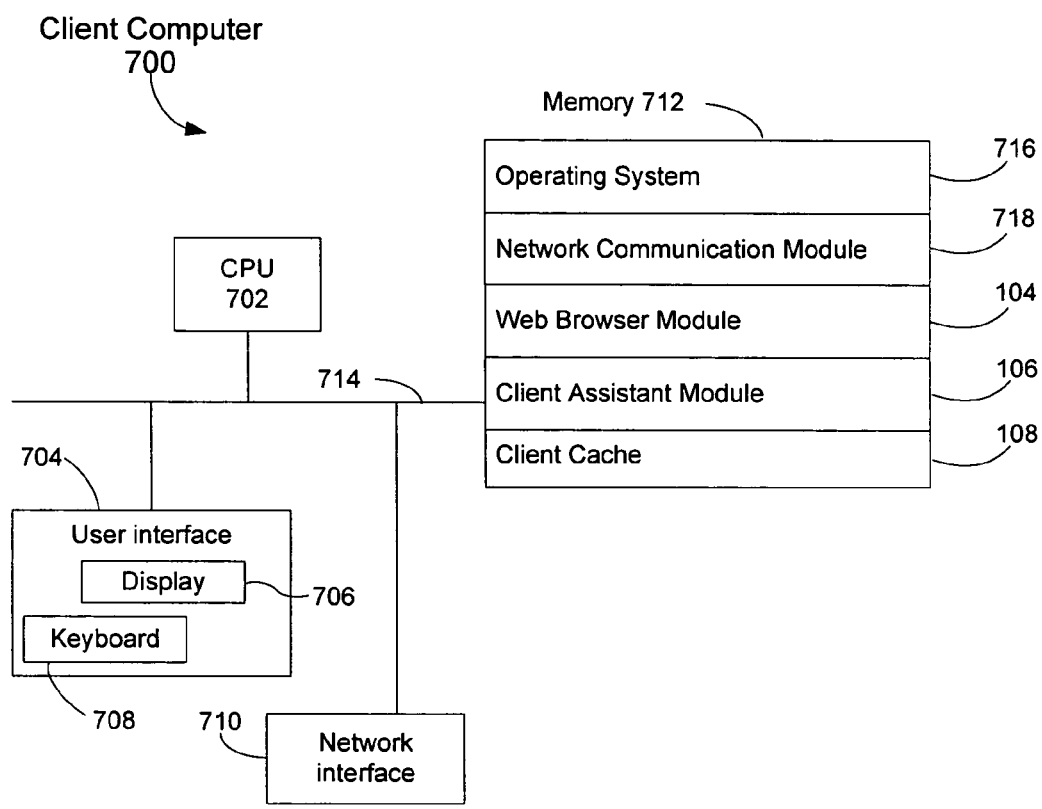
FIG. 7 is a block diagram illustrating the structure of an exemplary client computer according to some embodiments of the invention.

FIG. 7 depicts a client computer 700 in accordance with some embodiments of the present invention, which typically includes one or more processing units (CPU's) 702, one or more network or other communications interfaces 710, memory 712, and one or more communication buses 714 for interconnecting these components. The communication buses 714 may include circuitry (sometimes called a chipset) that interconnects and controls communications between system components. The client computer 700 may also include a user interface 704 comprising a display device 706 and a keyboard 708. Memory 712 may include high speed random access memory and may also include non-volatile memory, such as one or more magnetic disk storage devices. Memory 712 preferably stores the following programs, modules and data structures, or a subset or superset thereof:

- an operating system 716 that includes procedures for handling various basic system services and for performing hardware dependent tasks;
- a network communication module (or instructions) 718 that is used for connecting the client computer 700 to other computers via the one or more communication network interfaces 710;
- an application (or instructions) 104, such as a web browser application, for receiving a user request for a document and rendering the requested document on a computer monitor or other user interface device;
- a client assistant module (or instructions) 106, as described elsewhere in this document; and
- client cache 108 for storing user-requested documents and preloaded documents.

Figure 8:
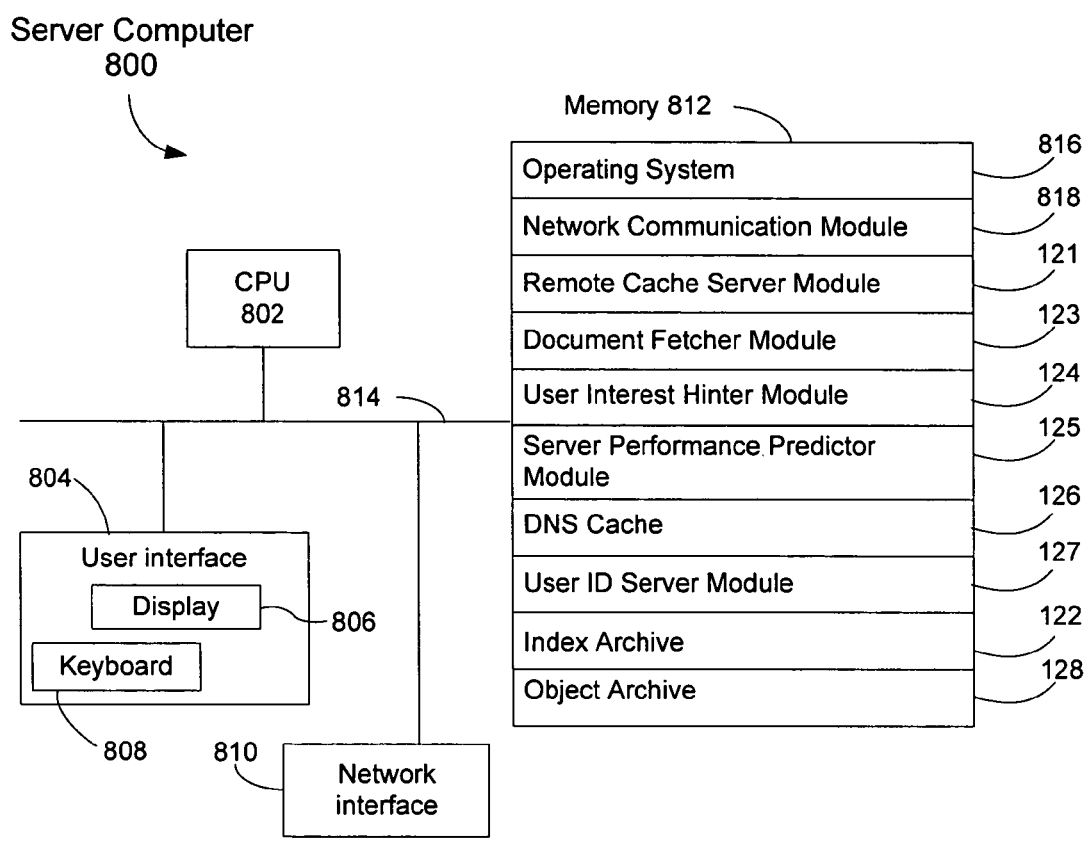
FIG. 8 is a block diagram illustrating the structure of an exemplary server computer according to some embodiments of the invention.

Similarly, FIG. 8 depicts a server computer 800 in accordance with one embodiment of the present invention, which typically includes one or more processing units (CPU's) 802, one or more network or other communications interfaces 810, memory 812, and one or more communication buses 814 for interconnecting these components. The server computer 800 may optionally include a user interface 804 comprising a display device 806 and a keyboard 808. Memory 812 may include high speed random access memory and may also include non-volatile memory, such as one or more magnetic disk storage devices. Memory 812, or one or more of the storage devices (e.g., one or more non-volatile storage devices) in memory 812, includes a computer readable storage medium. Memory 812 or the computer readable storage medium of memory 812 preferably stores the following programs, modules and data structures (sometimes collectively called a computer program product), or a subset or superset thereof:

- an operating system 816 that includes procedures for handling various basic system services and for performing hardware dependent tasks;
- a network communication module (or instructions) 818 that is used for connecting the server computer 800 to other computers via the one or more communication network interfaces 810 and one or more communication networks, such as the Internet, other wide area networks, local area networks, metropolitan area networks, and the like;
- a remote cache server module (or instructions) 121 for receiving a document retrieval request from a client assistant and transferring the requested document and candidate documents to the client assistant 106;
- a document fetcher module (or instructions) 123 for retrieving documents from different web servers;
- a user interest hinter module (or instructions) 124 for predicting a user's browsing interest based on various types of user activities including the mouse cursor movements and the usage statistics as well as the layouts of the documents retrieved from different web servers;
- a server performance predictor module (or instructions) 124 for comparing the speeds of serving a document to a requesting client computer from a web server and the server computer;
- a DNS cache 126 for storing records that map the hostnames of the web servers to their respective IP addresses;
- a user ID server module (or instructions) 127 for storing records of the users using the server computer;
- an index archive 122 for storing a plurality of document identity records; in an exemplary embodiment each record includes a document's URL fingerprint, a document content fingerprint and document content freshness parameters; and
- an object archive 128 for managing a plurality of documents; in an exemplary embodiment, each record includes a document's content fingerprint and a copy of the document content.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A computer-implemented method, comprising:
    at a server computer having one or more processors and memory storing one or more programs for execution by the one or more processors:
    selecting a first document when a user at the client device moves a mouse cursor along a predetermined mouse trajectory towards a region containing a link to the first document that is located in a second document; and at the server computer's initiative, initiating preloading the first document to a client device before the mouse reaches the region.

2. A system for serving documents to a user at a client device, comprising:

memory;

one or more processors; and at least one program stored in the memory and executed by the one or more processors, the at least one program further including:

instructions for selecting a first document when a user at the client device moves a mouse cursor along a predetermined mouse trajectory towards a region containing a link to the first document that is located in a second document; and instructions for initiating preloading the first document to a client device before the mouse reaches the region.

3. A computer program product for use in conjunction with a computer system, the computer program product comprising a computer readable storage medium storing one or more programs configured for execution by one or more processors of a computer system, the one or more programs comprising:

instructions for selecting a first document when a user at the client device moves a mouse cursor along a predetermined mouse trajectory towards a region containing a link to the first document that is located in a second document; and instructions for initiating preloading the first document to a client device before the mouse reaches the region.

4. The method of claim 1 wherein the selecting includes performing the selecting in accordance with a criterion that the mouse trajectory is consistent with purposeful movement of the mouse cursor towards the region containing the link to the first document.

5. The method of claim 1 wherein the selecting includes performing the selecting in accordance with a criterion that the mouse cursor movement exceeds a predefined threshold velocity.

6. The method of claim 1 wherein the selecting includes performing the selecting in accordance with a criterion that the mouse cursor follows a nearly linear path.

7. The system of claim 2 wherein the instructions for selecting include instructions for performing the selecting when the mouse trajectory is consistent with purposeful movement of the mouse cursor towards the region containing the link to the first document.

8. The system of claim 2 wherein the instructions for selecting include instructions for performing the selecting when the mouse cursor movement exceeds a predefined threshold velocity.

9. The system of claim 2 wherein the instructions for selecting include instructions for performing the selecting when the mouse cursor follows a nearly linear path.

10. The computer program product of claim 3 wherein the instructions for selecting include instructions for performing the selecting in accordance with a criterion that the mouse trajectory is consistent with purposeful movement of the mouse cursor towards the region containing the link to the first document.

11. The computer program product of claim 3 wherein the instructions for selecting include instructions for performing the selecting in accordance with a criterion that the mouse cursor movement exceeds a predefined threshold velocity.

12. The computer program product of claim 3 wherein the instructions for selecting include instructions for performing the selecting in accordance with a criterion that the mouse cursor follows a nearly linear path.

\* \* \* \* \*